United States Patent
Ll et al.

(10) Patent No.: US 6,317,264 B1
(45) Date of Patent: Nov. 13, 2001

(54) THIN FILM POLARIZING DEVICE HAVING METAL-DIELECTRIC FILMS

(75) Inventors: Li Ll, Orleans; Zhengda Pang, Gloucester, both of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/465,463

(22) Filed: Dec. 17, 1999

Related U.S. Application Data (60) Provisional application No. 60/112,970, filed on Dec. 18, 1998.

(51) Int. Cl.⁷ ....................................... G02B 5/30
(52) U.S. Cl. .................. 359/487; 359/498; 359/583; 359/585; 359/629
(58) Field of Search ................... 359/487, 498, 359/583, 585, 629

(56) References Cited

U.S. PATENT DOCUMENTS

| | | | |
|---|---|---|---|
| 5,912,762 | * 6/1999 | Li et al. | 359/495 |
| 5,982,541 | * 11/1999 | Li et al. | 359/497 |
| 6,104,530 | * 8/2000 | Okamura et al. | 359/359 |

\* cited by examiner

*Primary Examiner*—Darren Schuberg
(74) *Attorney, Agent, or Firm*—Marks & Clerk

(57) ABSTRACT

A thin film polarizing device has a functional core consisting of at least two alternating thin film layers of metal and dielectric sandwiched between a pair of optical media providing input and output ports. The thicknesses of said layers and the optical constants of said layers and said optical media are selected such that the equivalent admittance of said functional core substantially matches the admittance of said optical media for one plane of polarization, thus allow light with said polarization to be transmitted, and has substantially only an imaginary part for the other plane of polarization, thus allows light with the other polarization to be reflected, at predetermined wavelengths and angles of incidence.

15 Claims, 8 Drawing Sheets

1. A three-layer symmetrical structure   A single-layer structure is equivalent to

2.     S / (D M D)$^N$ / S    is equivalent to    S / E, N *Γ / S $E$ - *Equivalent admittance*
$\Gamma$ - *Equivalent phase thickness*
$N$ - *Number of periods*

THIN FILM POLARIZING DEVICE HAVING METAL-DIELECTRIC FILMS

CROSS REFERENCED TO RELATED APPLICATION

This application claims priority under 35 USC 119(e) from our US provisional application Ser. No. 60/112,970 filed on Dec. 18, 1998.

FIELD OF THE INVENTION

This invention relates to the field of optics, and more particularly to thin film polarizing devices.

BACKGROUND OF THE INVENTION

Polarizing devices, including polarizers and polarizing beam-splitters (PBS), are essential optical components and are currently widely used in optical instruments, lasers, electro-optic displays, optical recording, etc. In polarizers, only the transmitted or reflected light is used, the other beam is of no essence. In PBSs, both the transmitted and the reflected beams are utilized and are equally important. Several parameters are often used to describe the performance of a polarizer or PBS: 1) the wavelength range over which the polarizer or PBS is operating; 2) the angular field of the incident light in which the polarizer or PBS is effective; 3) the extinction ratio of the desired to the unwanted a polarized light after the light passes through or is reflected by the polarizer or PBS; and 4) the transmittance or reflectance for the desired polarization.

Commonly available polarizers and polarizing beam-splitters can be divided into several types that depend upon different physical principles: pile-of-plates polarizers, reflection polarizers, Polaroid sheet polarizers, polarizers based on birefringent crystals, metallic grid polarizers, and thin film interference polarizers or PBSs.

Since the present invention is related to a thin film polarizing device, the prior art in this field is reviewed in the following section.

Thin film polarizers or PBSs are based on the light interference in thin films, sometimes also in combination with other physical phenomena. Conventional thin film polarizers or PBSs are relatively versatile in terms of design and fabrication; they are not limited by size and they can be manufactured on large scale and at a low cost. However, they are also limited in performance.

The most commonly used wide band thin film polarizer was invented in 1946 by MacNeille (U.S. Pat. No. 2,403,731). It is based on the Brewster angle phenomenon and on light interference in thin films. Because of its importance, the theory on which it is based and its performance will be compared at some length in Section 6 with those of the PBS operating at angles greater than the critical angle proposed in this paper. Here it is sufficient to say that the MacNeille polarizer operates over a broad band of wavelengths, but is very sensitive to the angle of incidence. Once the incident angle moves away from the Brewster angle by ±2°, the performance of the polarizer deteriorates dramatically. The device can be used as a PBS, but the extinction ratio for the reflected beam in the conventional configuration of the device is rather low.

Another thin film PBS is based on the separation that occurs between the edges for s- and p-polarized light of a cut-off filter that has been deposited onto a parallel plate or prism cubes and that is illuminated at an oblique angle. In the region between the two edges, s-polarized light is reflected and p-polarized light is transmitted. The angular field of a plate polarizer is relatively large compared to that of a MacNeille polarizer. The extinction ratio for the transmitted beam can be high if a large number of layers is used to reflect the s-polarized light. However, it is harder to achieve a high rejection ratio for the reflected beam. The plate polarizer has a very small bandwidth. It is often used in laser systems.

For many applications, there is a need for low-cost and easily-producible non-absorbing, broadband, wide-angle polarizing beam-splitters (PBS). For example, a high efficiency back-lighting system for direct-view LCDs, disclosed in our co-pending patent application derived from US provisional application no. 60/110,166, requires the use of non-absorbing PBS to recover the polarization loss. The light loss in current LCDs is more than 50%. However, none of the currently available polarizers or PBS meet the display requirements either because of their high absorption, or limited bandwidth, small angular field, limited size or high cost.

The only thin film polarizing beam-splitter that meets the display requirements is the novel PBS that was described in the U.S. Pat. No. 5,912,762 by Li Li and J. A. Dobrowolski. This PBS is broad-band, wide-angle, has high extinction ratios for both transmitted and reflected beams. It is based on the effects of frustrated total internal reflection and light interference in thin films. It works at angles larger than the critical angle. The refractive index of the substrate has to be larger than that of the low-index material. The higher the refractive index of the substrate, the better the performance is.

The above patent describes a new concept of designing polarizing beam-splitters by using the effects of frustrated total internal reflection (FTIR) and interference. The PBS consists of low and high refractive index layers. The refractive indices of the low or high index layers are lower or higher than that of the substrate, respectively. The incident angle upon the low index layers is larger than the critical angle. As a result, the admittances of these low index layers have only imaginary parts. Therefore, they behave like perfect metals and they only attenuate light but do not absorb light. If these low index layers are thin, then frustrated total internal reflection will occur inside them, therefore, we can also call them FTIR layers. By combining the low and high index layers in a symmetrical structure and by carefully choosing the right layer thicknesses, the equivalent admittance of the symmetrical structure can have very different values for s-and p-polarized light over a range of angles and wavelength. Therefore, the symmetrical structure can be used to design very broad-band and wide-angle polarizing beam-splitters.

Although the above-mentioned PBS has much better performance than traditional devices, it has some disadvantages for direct-view LCD back-lighting systems. In these systems, plastic substrates are preferred because low cost and low weight are essential factors in this application. Unfortunately, the highest refractive of indices of optical plastics is about 1.60, corresponding to that of polycarbonate, lower than that of some high-index glasses (for example 1.75). Therefore, the performance of the PBS is less satisfactory. In addition, the PBS requires accurate thickness control that is not desirable for large-scale production. Furthermore, for some cases, the PBS requires optical contacts in cementing two substrates together. This may limit the size of the PBS and also result in a high manufacturing cost.

An object of the invention is to address this problem.

SUMMARY OF THE INVENTION

According to the present invention there is provided a thin film polarizing device comprising a functional core consisting of at least two alternating thin film layers of metal and dielectric sandwiched between a pair of transmissive optical media providing input and output ports, the thicknesses of said layers and the optical constants of said layers and said optical media being selected such at predetermined wavelengths and angles of incidence the optical admittance of said functional core substantially matches the optical admittance of said optical media for one polarization and has substantially an imaginary part for the other polarization, whereby light with said one polarization is transmitted, and light with the other polarization is reflected.

The invention provides a simple polarizing beam-splitter with a metal-dielectric thin film coating. Such a polarizing beam-splitter can have a broadband and a wide angular field, reasonable extinction ratios. The thin film coating can have as few as three layers (typical five layers) and can be deposited on optical glasses or plastic substrates by conventional thin film deposition process in large scale, resulting in a lower manufacturing cost. The simple thin film polarizing device can be used in many potential applications. For example, it can be used in the proposed high efficiency back-lighting systems. They can also be used as pre-polarizer for many applications. To reduce the size of the PBSs, they can also be deposited onto thin micro-prisms.

The metal-like material can be any material that has optical properties similar to a metal, i.e. with a small real refractive index and large extinction coefficient at the predetermined wavelengths. Such non-metal materials include Si or Ge or oxides thereof.

Special metals such as silver or gold that has large extinction coefficients and low refractive indices are employed. Unlike conventional all-dielectric thin film PBSS, the performance of the metal-dielectric PBS depends on the ratio of the extinction coefficient of the metals and the refractive index of the dielectric material. The higher the ratio, the better the performance and broader as well.

The invention also provides a method of making a thin film polarizing device comprising the steps of depositing at least two alternating thin film layers of metal-like material and dielectric on a first substrate; and providing a second substrate so that said two alternating thin film layers are sandwiched between said substrates providing input and output ports, and wherein the thicknesses of said layers and the optical constants of said layers and said optical media are selected such that at predetermined wavelengths and angles of incidence the optical admittance of said functional core substantially matches the admittance of said optical media for one polarization and has substantially only an imaginary part for the other plane of polarization, whereby light with said one polarization is transmitted and light said other polarization is reflected.

BRIEF DESCRIPTION OF THE DRAWINGS

The invention will now be described in more detail, by way of example only, with reference to the accompanying drawings, in which.

DETAILED DESCRIPTION OF THE INVENTION

Theory

The thin film polarizing device in accordance with the present invention is based on the use of light interference in thin metal and dielectric layers. The theory of such a device is explained in the following text.

Figure 1:
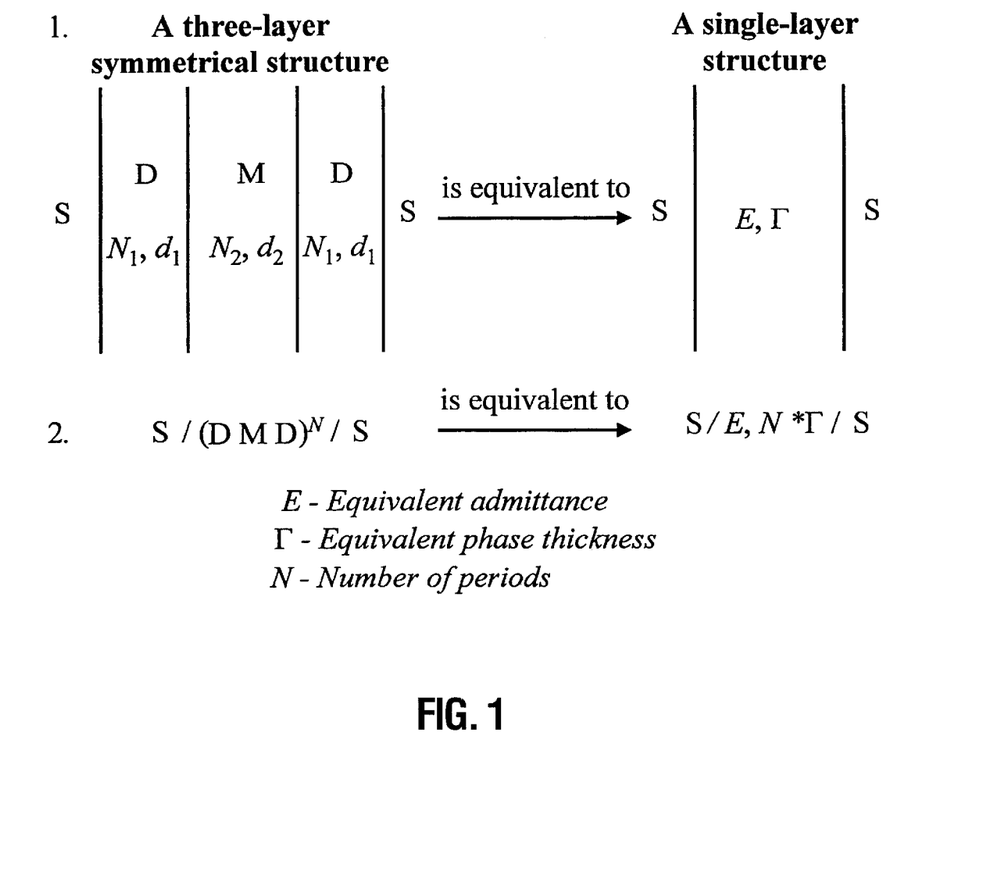
FIG. 1 shows the schematic diagram of the equivalent layer concept of a symmetric layer structure.

Mathematically, a thin film metal-dielectric symmetrical structure S|(DMD)|S can be replaced by a single equivalent layer (FIG. 1). Here D, M and S stand for a dielectric layer, a metal layer and a substrate respectively. The equivalent admittance E and the equivalent phase thickness $\Gamma$ of the single equivalent layer can be expressed as:

$$\begin{cases} E = \sqrt{\dfrac{\eta_1^2\left(\sin 2\delta_1 \cos\delta_2 + \frac{1}{2}(\eta_1/\eta_2 + \eta_2/\eta_1)\cos 2\delta_1 \sin\delta_2 - \frac{1}{2}(\eta_1/\eta_2 - \eta_2/\eta_1)\sin\delta_2\right)}{\left(\sin 2\delta_1 \cos\delta_2 + \frac{1}{2}(\eta_1/\eta_2 + \eta_2/\eta_1)\cos 2\delta_1 \sin\delta_2 + \frac{1}{2}(\eta_1/\eta_2 - \eta_2/\eta_1)\sin\delta_2\right)}} \\ \Gamma = \arccos\left(\cos 2\delta_1 \cos\delta_2 + \frac{1}{2}(\eta_1/\eta_2 + \eta_2/\eta_1)\sin 2\delta_1 \sin\delta_2\right) \end{cases} \quad (1)$$

where $\eta_0$, $\eta_1$ and $\eta_2$ are given by Equation (2a) and $\delta_1$ and $\delta_2$ are given by Equation (2b), $$\begin{cases} \eta_0 = n_0\cos\theta_0 \\ \eta_1 = n_1\cos\theta_1 \quad \text{(s-pol)}, \\ \eta_2 = (n_2 - k_2 i)\cos\theta_2 \end{cases} \begin{cases} \eta_0 = n_0\cos\theta_0 \\ \eta_1 = n_1\cos\theta_1 \quad \text{(p-pol)}, \\ \eta_2 = (n_2 - k_2 i)\cos\theta_2 \end{cases} \quad (2a)$$

$$\begin{cases} \delta_1 = \frac{2\pi}{\lambda} n_1 d_1 \cos\theta_1 = \frac{2\pi}{\lambda_0} g n_1 d_1 \cos\theta_1 \\ \delta_2 = \frac{2\pi}{\lambda}(n_2 - k_2 i) d_2 \cos\theta_2 = \frac{2\pi}{\lambda_0} g(n_2 - k_2 i) d_2 \cos\theta_2 \end{cases} \quad (2b)$$

Here, $n_1$ is the refractive index of the dielectric layer, $n_2$–$k_2 i$ is the complex refractive index of the metal layer ($n_2$ is the refractive index and $k_2$ is the extinction coefficient), and $n_0$ is the refractive index of the substrate. $d_1$ and $d_2$ are the thickness of the dielectric layer D and the metal layer M, respectively. $\theta_0$ is the incident angle in the incident medium and the substrate and $\lambda$ is the wavelength. For a metal-dielectric symmetrical structure with the same basic structure (DMD) but with N periods, the equivalent admittance is also E but the equivalent phase thickness is $\Gamma*N$. The above equations and the following results also apply to a $(MDM)^N$ metal-dielectric symmetrical structure.

The general requirement for forming a polarizing beamsplitter is that the equivalent admittance of the symmetrical structure matches the admittance of the substrate for one polarization. As a result, all the light in this polarization state is transmitted. However, for the other polarization, the equivalent admittance has only the imaginary part, therefore, the symmetrical structure acts like a perfect metal. As long as the total phase thickness is thick enough, the light in this polarization is completely reflected.

Based on the above general requirement, the exact conditions for forming a PBS have been derived from the above equations and will be described in detail. For simplicity, the following assumptions are made:

1. $k_2 \gg n_2$ in the metal layers, or $n_2 \approx 0$;
2. the layers are rather thin, therefore, $\cos(\delta_1)=\cos(\delta_2)=1$ and $\sin(\delta_1)=\delta_1$, $\sin(\delta_2)=\delta_2$;

The equivalent admittance, $E_s$ and $E_p$, and the phase thickness, $\Gamma_s$ and $\Gamma_p$, of the single equivalent layer for both s- and p-polarized light can be simplified as:

$$E_S = \sqrt{\frac{2d_1(n_1^2 - n_0^2) - d_2(k_2^2 + n_0^2)}{(2d_1 + d_2)} + n_0^2\cos^2\theta_0} \quad (3a)$$

$$E_P = \sqrt{\frac{-(2d_1 n_1^2 - d_2 k_2^2)n_1^2 k_2^2}{-(2d_1 + d_2)n_1^2 k_2^2 - (-2d_1 k_2^2 + d_2 n_1^2)n_0^2 \sin^2\theta_0}} \quad (3b)$$

$$\Gamma_S = \arccos\left(1 - \frac{4\pi^2 d_1 d_2 (n_1^2 + k_2^2)}{\lambda^2}\right) \quad (4a)$$

$$\Gamma_P = \arccos\left(1 - \frac{4\pi^2 d_1 d_2 \left((n_1^2 + k_2^2) + \left(\frac{n_1^2}{k_2^2} - \frac{k_2^2}{n_1^2}\right) n_0^2 \sin^2\vartheta_0\right)}{\lambda^2}\right) \quad (4b)$$

In order to transmit p-polarized light, $E_p$ should be equal to the admittance of the substrate $\eta_{0p}$, $$E_P = \sqrt{\frac{(2d_1 n_1^2 - d_2 k_2^2)n_1^2 k_2^2}{(2d_1 + d_2)n_1^2 k_2^2 + (-2d_1 k_2^2 + d_2 n_1^2)n_0^2 \sin^2\theta_0}} = \eta_{0P} = n_0/\cos\theta_0 \quad (5)$$

From equation (5), one obtains:

$$d_2 = \frac{k_2^2(n_1^2 - n_0^2)(n_1^2 - (n_1^2 + n_0^2)\sin^2\theta_0)}{n_1^2(k_2^2 + n_0^2)(k_2^2 - (k_2^2 - n_0^2)\sin^2\theta_0)} 2d_1 \quad (6)$$

In order to have a positive $d_2$, any one of the following groups of conditions must be met:

$$c1. \begin{cases} (n_1^2 - n_0^2) > 0; \\ n_1^2 - (n_1^2 + n_0^2)\sin^2\theta_0 > 0; \text{ and,} \\ k_2^2 - (k_2^2 - n_0^2)\sin^2\theta_0 > 0. \end{cases} \quad (7)$$

$$c2. \begin{cases} (n_1^2 - n_0^2) < 0; \\ n_1^2 - (n_1^2 + n_0^2)\sin^2\theta_0 < 0; \text{ and,} \\ k_2^2 - (k_2^2 - n_0^2)\sin^2\theta_0 > 0. \end{cases} \quad (8)$$

$$c3. \begin{cases} (n_1^2 - n_0^2) > 0; \\ n_1^2 - (n_1^2 + n_0^2)\sin^2\theta_0 < 0; \text{ and,} \\ k_2^2 - (k_2^2 - n_0^2)\sin^2\theta_0 < 0. \end{cases} \quad (9)$$

$$c4. \begin{cases} (n_1^2 - n_0^2) < 0; \\ n_1^2 - (n_1^2 + n_0^2)\sin^2\theta_0 > 0; \text{ and,} \\ k_2^2 - (k_2^2 - n_0^2)\sin^2\theta_0 < 0. \end{cases} \quad (10)$$

From conditions c3 and c4, one obtains:

$$\begin{cases} \sin^2\theta_0 > \frac{k_2^2}{k_2^2 - n_0^2} > 1, \text{ if } k_2 > n_0 \\ \sin^2\theta_0 < \frac{k_2^2}{k_2^2 - n_0^2} < 0, \text{ if } k_2 < n_0 \end{cases}.$$

Since for a real incident angle $\theta_0$, $\sin^2(\theta_0)$ is always between 0 and 1. Therefore, conditions c3 and c4 can not be satisfied and thus are eliminated. Conditions c1 and c2 can be further simplified:

$$c1: \begin{cases} n_1 > n_0; \\ \sin^2\theta_0 < \frac{n_1^2}{n_1^2 + n_0^2}; \text{ and,} \\ \sin^2\theta_0 < \frac{k_2^2}{k_2^2 - n_0^2} < 1, \text{ if } k_2 > n_0; \text{ or } \sin^2\theta_0 > \frac{k_2^2}{k_2^2 - n_0^2} > 0, \text{ if } k_2 < n_0. \end{cases} \quad (11)$$

-continued $$c2: \begin{cases} n_1 < n_0; \\ \sin^2\theta_0 > \dfrac{n_1^2}{n_1^2 + n_0^2} = x3; \text{ and,} \\ \sin^2\theta_0 < \dfrac{k_2^2}{k_2^2 - n_0^2} < 1, \text{ if } k_2 > n_0; \text{ or } \sin^2\theta_0 > \dfrac{k_2^2}{k_2^2 - n_0^2} < 1, \text{ if } k_2 < n_0. \end{cases} \quad (12)$$

It is clear that as long as condition c1 or c2 is satisfied and $d_2$ satisfies equation (6) for an incident angle $\theta_0$, the metal-dielectric symmetrical structure will transmit p-polarized independent of wavelengths.

Figure 2A:
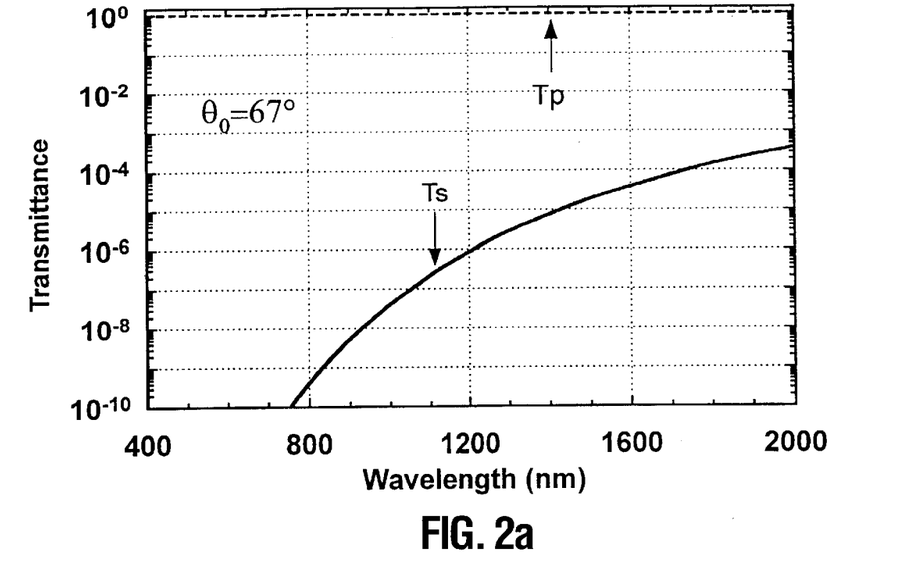
FIG. 2a shows the calculated transmittance of the first example of a metal-dielectric symmetrical structure at the design angle $\theta_0=67.0°$.
Figure 2B:
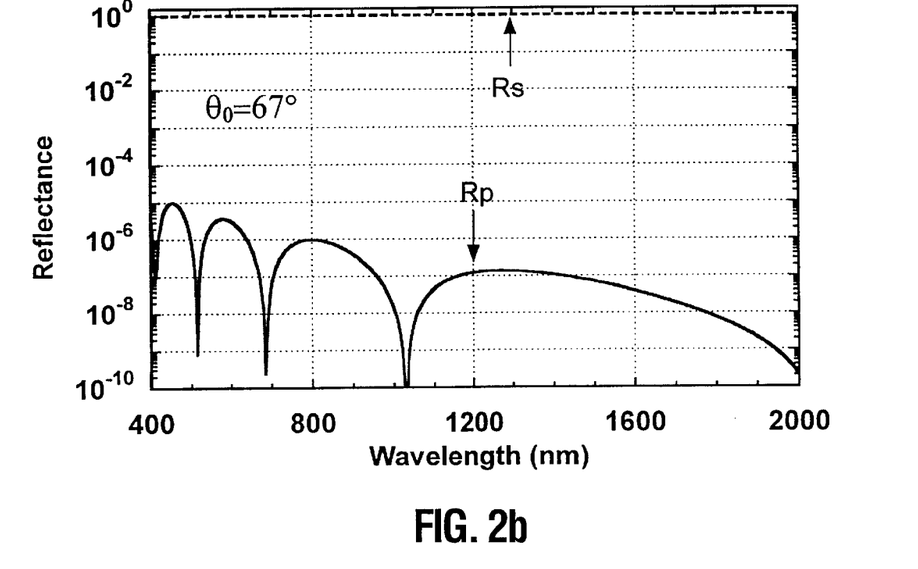
FIG. 2b shows the calculated reflectance of the first example of a metal-dielectric symmetrical structure at the design angle $\theta_0=67.0°$.

To demonstrate this, a first example with a thin metal-dielectric symmetric structure is calculated. Here, $n_0=1.52$, $n_1=1.45$, $k_2=3.5$, $d_1=20.0$ nm, and N=60. The design angle of incidence $\theta_0$ is specified to be 67.0° according to condition c2. $d_2$ is calculated to be 1.4228 nm. FIGS. 2a and 2b show the calculated transmittance and reflectance of both s- and p-polarized light from 400 nm to 2000 nm at the design angle $\theta_0=67.0°$. As expected, the reflectance of p-polarized light is very low, close to zero, and all p-polarized light is transmitted over the whole spectral region.

In order to reflect s-polarized light, $E_s$ should only have the imaginary part. Substitute $d_2$ with equation (6), $E_s$ can be simplified as:

$$\begin{cases} E_s^2 = \dfrac{n_0^2((n_1^2 k_2^2 - n_0^4)\sin^4\theta_0 + (n_0^2 n_1^2 - n_1^2 k_2^2 - n_0^2 k_2^2)\sin^2\theta_0 + n_1^2 k_2^2)}{n_1^2 k_2^2 + (n_0^4 - n_1^2 k_2^2)\sin^2\theta_0} \\ = \dfrac{n_0^2(a\sin^4\theta_0 + b\sin^2\theta_0 + c)}{c - a\sin^2\theta_0} \end{cases} \quad (13)$$

$$\text{where } \begin{cases} a = n_1^2 k_2^2 - n_0^4 \\ b = n_1^2 n_0^2 - n_1^2 k_2^2 - k_2^2 n_0^2 \\ c = n_1^2 k_2^2 \end{cases} \quad (14)$$

In order to have imaginary $E_s$, the above equation should be negative. Therefore, the conditions are:

$$c6. \begin{cases} a\sin^4\theta_0 + b\sin^2\theta_0 + c > 0 \\ c - a\sin^2\theta_0 < 0 \end{cases} \quad (15)$$

$$c7. \begin{cases} a\sin^4\theta_0 + b\sin^2\theta_0 + c < 0 \\ c - a\sin^2\theta_0 > 0 \end{cases} \quad (16)$$

From condition c6, one obtains:

$$c6. \begin{cases} a\sin^4\theta_0 + b\sin^2\theta_0 + c > 0 \\ \sin^2\theta_0 > \dfrac{c}{a} = \dfrac{n_1^2 k_2^2}{n_1^2 k_2^2 - n_0^4} > 1, \text{ if } a > 0; \text{ or} \\ \sin^2\theta_0 < \dfrac{c}{a} = \dfrac{n_1^2 k_2^2}{n_1^2 k_2^2 - n_0^4} < 0, \text{ if } a < 0. \end{cases}$$

It is clear that there is no real $\theta_0$ that can satisfy condition c6, therefore, condition c6 is eliminated from the consideration. Condition c7 can be further simplified as:

$$c7. \begin{cases} x_{\min} < \sin^2\theta_0 < x_{\max}, \text{ if } a > 0; \\ \sin^2\theta < x_{\min}, \text{ or, } \sin^2\theta_0 > x_{\max}, \text{ if } a < 0 \end{cases}$$

where,

-continued $$\begin{cases} a = n_1^2 k_2^2 - n_0^4 \\ b = n_1^2 n_0^2 - n_1^2 k_2^2 - k_2^2 n_0^2 \\ c = n_1^2 k_2^2 \end{cases} \quad (17a)$$

$$\begin{cases} x_1 = \dfrac{-b - \sqrt{b^2 - 4ac}}{2a} \\ x_2 = \dfrac{-b + \sqrt{b^2 - 4ac}}{2a} \end{cases} \text{; and,} \quad (17b)$$

$$\begin{cases} \sin^2\theta_{\min} = \min\{x_1, x_2\} \\ \sin^2\theta_{\max} = \max\{x_1, x_2\} \end{cases} \quad (17c)$$

To verify this, the first example with a thin metal-dielectric symmetric structure is calculated too. From condition c7, $\theta_0$ must be larger than 61.23°. The design angle of 67.0° meets this condition. FIGS. 2a and 2b show the calculated transmittance and reflectance of both s- and p-polarized light from 400 nm to 2000 nm at the design angle $\theta_0=67.01$. As expected, the transmittance of s-polarized is very low, close to zero, and all s-polarized light is reflected over the whole spectral region. Therefore, the above coating is a polarizing beam-splitter.

For a polarizing beam-splitter to transmit p-polarized light, conditions c1 or c2 must be satisfied, to reflect s-polarized light, condition c7 must be satisfied. These three conditions are very useful. They give general guidelines on how to select coating materials and design angles and also on how to design the metal-dielectric polarizing device in accordance with the present invention. A normal design procedure is to use these conditions to generate a starting design. Then the starting design is always optimized with a computer program to obtain a final design. In the final design, the symmetry of the layer structure may not be preserved. In addition, the layer thicknesses in the final design could be rather thick for the dielectric layers. Furthermore, metal materials with considerately large refractive index n can also be used. In this case, the absorption is rather high.

PREFERRED EMBODIMENTS

Figure 3:
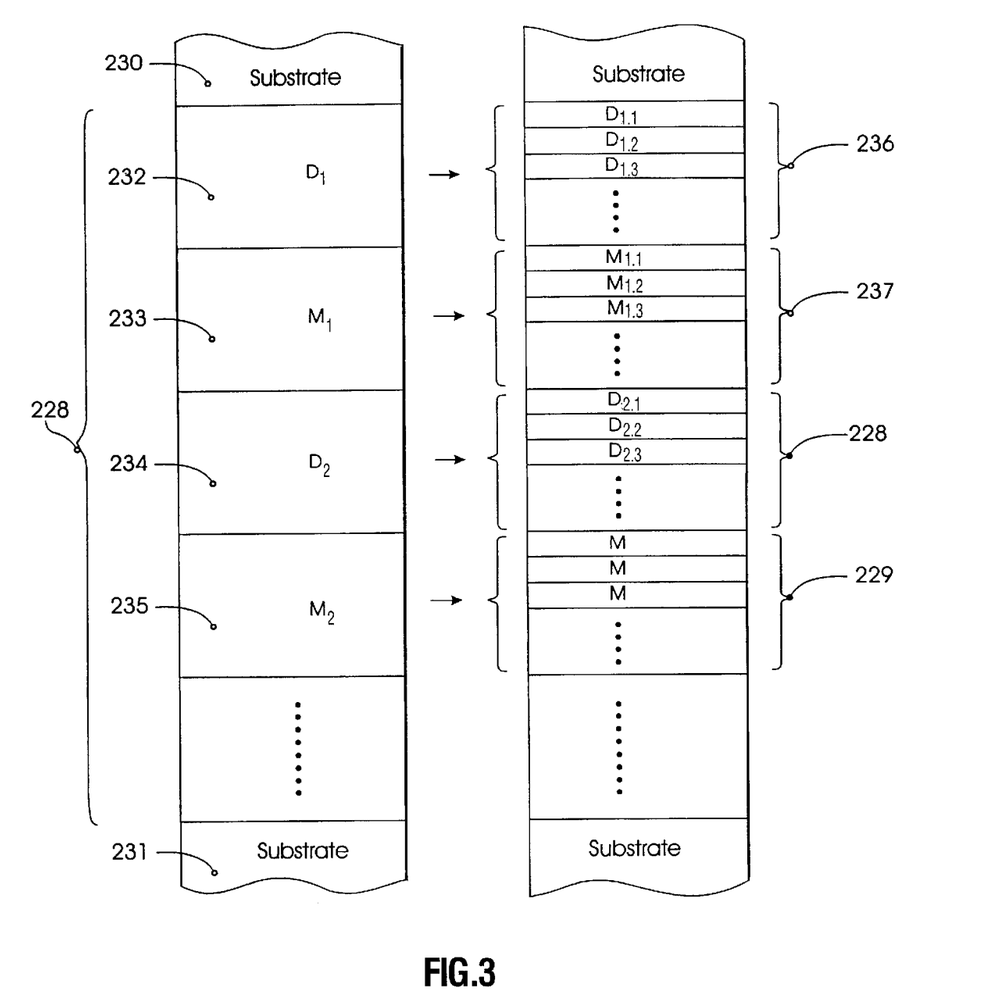
FIG. 3 shows the schematic diagram of the layer structure of the thin film polarizing device in accordance with the present invention.

In general, the thin film polarizing device in accordance with the present invention in FIG. 3 is comprised of first and second light transmissive substrates 230 and 231 serving as input and output ports, and a plurality of thin film layers 238 disposed between the first and second substrates. The thin film layers 238 consist of alternating dielectric layers 232, 234, etc., and metal layers 233, 235, etc. Each dielectric layer can include a number of dielectric sub-layers 236, 228 etc., having one or more different refractive indices. The dielectric layers can be selected from transparent materials such as $MgF_2$, $SiO_2$, $Al_2O_3$, $Nb_2O_5$, $TiO_2$, $ZrO_2$, $HfO_2$, Si, Ge, or mixtures of two or more transparent materials, etc. Each metal layer can include a number of metal sub-layers 237, 229, etc., each having one or more different complex refractive indices. The metal layers can be selected from metal materials such as Ag, Au, Al, nickel, Cu, etc., or metal alloys, or any material that has an extinction coefficient larger than that of the real refractive index, such as Si, Ge, or oxides in the selected spectral regions. Although the term "metal layer" is used in the description, it is clear that it can be extended to any material that has the required property of that the real refractive index n is small and the extinction Several embodiments of the thin film metal-dielectric polarizing device in accordance with the present invention have been designed. Conditions c1, c2 and c7 are used to find the starting designs. The thin film coatings and their performances are summarized in Table 1.

TABLE 1

The layer structures and performances of the five embodiments

| | | | Embodiments | | | | | | | |
|---|---|---|---|---|---|---|---|---|---|---|
| | | 1 | | 2 | | 3 | | 4 | | 5 |
| Layer Structure | Mat. | Thick. (nm) | Mat. | Thick. (nm) | Mat. | Thick. (nm) | Mat. | Thick. (nm) | Mat. | Thick. (nm) |
| Sub. | 1.52 | — | 1.52 | | 1.52 | — | BK7 | — | BK7 | — |
| 1 | $(1.45)/0-3.50\ i/1.45)^{60}$ | | 1.45 | 49.73 | 1.52 | — | BK7 | — | BK7 | — |
| 2 | $d_1 = 20.00$ nm | | 0–3.50 i | 6.64 | 0–3.50 i | 6.74 | Ag | 5.25 | $SiO_2$ | 37.36 |
| 3 | $d_2 = 1.4228$ nm | | 1.45 | 215.09 | 1.45 | 210.43 | $SiO_2$ | 217.58 | Nickel | 4.63 |
| 4 | | | 0–3.50 i | 11.05 | 0–3.50 i | 13.19 | Ag | 10.05 | $SiO_2$ | 183.77 |
| 5 | | | 1.45 | 248.98 | 1.45 | 210.43 | $SiO_2$ | 216.15 | Nickel | 8.45 |
| 6 | | | 0–3.50 i | 11.77 | 0–3.50 i | 6.74 | Ag | 5.22 | $SiO_2$ | 220.70 |
| 7 | | | 1.45 | 254.6 | | | | | Nickel | 8.27 |
| 8 | | | 0–3.50 i | 12.17 | | | | | $SiO_2$ | 128.59 |
| 9 | | | 1.45 | 254.61 | | | | | | |
| 10 | | | 0–3.50 i | 11.77 | | | | | | |
| 11 | | | 1.45 | 248.98 | | | | | | |
| 12 | | | 0–3.50 i | 11.05 | | | | | | |
| 13 | | | 1.45 | 215.09 | | | | | | |
| 14 | | | 0–3.50 i | 6.64 | | | | | | |
| 15 | | | 1.45 | 49.73 | | | | | | |
| Sub. | 1.52 | — | 1.52 | — | 1.52 | — | BK7 | — | BK7 | — |
| No. of layers | | 121 | | 15 | | 5 | | 5 | | 7 |
| Total metric thickness (nm) | | 1285.4 | | 1607.9 | | 447.5 | | 454.3 | | 591.8 |
| Angle in prism | | 60°–70° | | 62°–72° | | 65°–75° | | 70°–80° | | 66°–76° |
| Angle in air | | ±7.6° | | ±7.6° | | ±7.6° | | ±7.6° | | |
| Wavelength (nm) | | 400–2000 | | 400–2000 | | 400–700 | | 400–700 | | 400–700 |
| Extinction Ratio (T) | | 100:1 | | 100:1 | | 80:1 | | 50:1 | | 50:1 |
| Extinction Ratio (R) | | 100:1 | | 100:1 | | 80:1 | | 50:1 | | 50:1 | coefficient k is large. The first and second substrates are made of transparent materials such as optical glasses, plastic, semiconductors, etc. The two prisms can be made of the same material. The thicknesses of the metal layers are small enough so that light incident upon the thin film layers at an oblique angles can be partially transmitted through the metal layers. This permits interference to take place between the light reflected at the interfaces of all thin film layers. In addition, the thicknesses of all layers are selected such that the optical admittance of the plurality of the thin film layers for polarized light is substantially the same as the optical admittance of the substrate for polarized light for a wide range of angles of incidence and a broad band of wavelengths. This permits substantially all incident p-polarized light to be substantially transmitted. The plurality of the thin film layers have an admittance for s-polarized light that is substantially different from the optical admittance of the substrate for s-polarized light for a wide-range of angles of incidence and a broad-band of wavelengths and thus they substantially reflect incident s-polarized light. The substrates are in the form of prisms that are shaped in such a manner as to allow the incident light to be incident upon the thin film layers at a plurality of angles that permits the above phenomenon to occur.

Figure 4A:
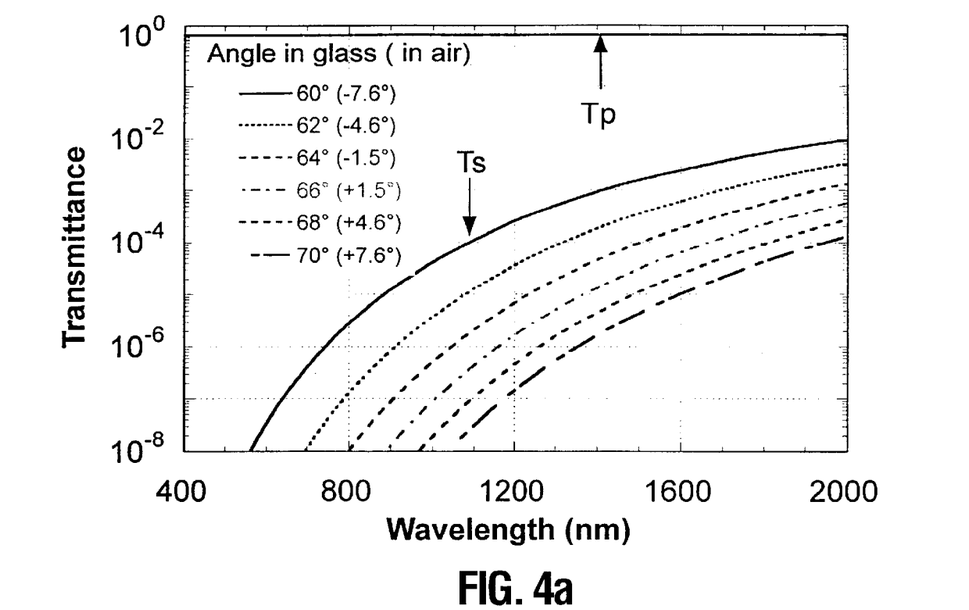
FIG. 4a shows the calculated transmittance of the first embodiment of the thin film polarizing device in accordance with the present invention at different angles of incidence.
Figure 4B:
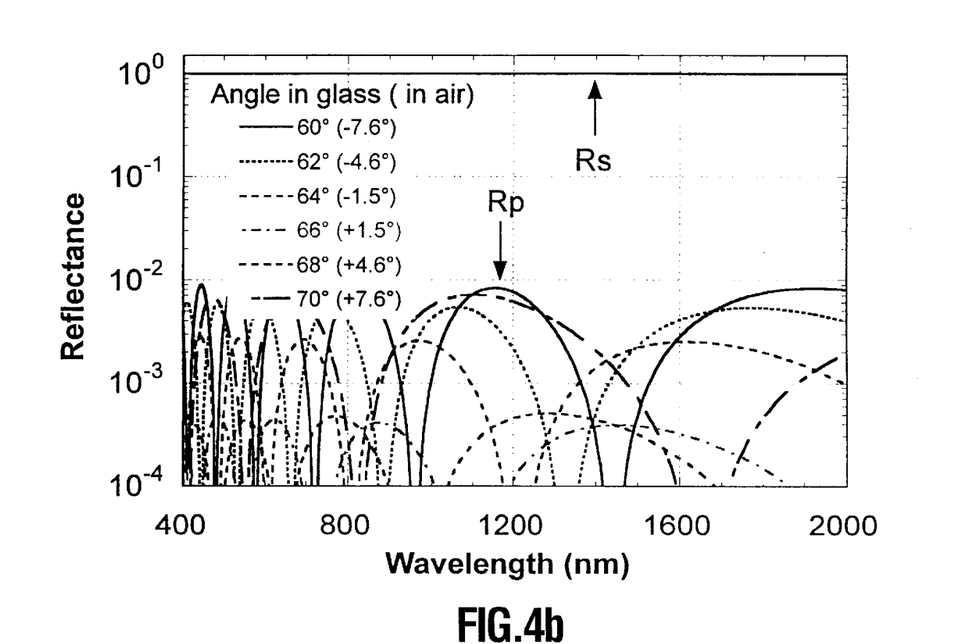
FIG. 4b shows the calculated reflectance of the first embodiment of the thin film polarizing device in accordance with the present invention at different angles of incidence.

The first embodiment has the same layer structure as the first example. $n_o=1.52$, $n_1=1.45$, $k_2=3.5$. The layer thicknesses are obtained from the equations in conditions c7 and c1 or c2. No optimization is applied. FIGS. 4a and 4b show the calculated transmittance and reflectance of both s- and p-polarized light from 400 nm to 2000 nm at different angles of incidence. The thin film polarizing coating is original designed to work at an angle of incidence $\theta_0=67.0°$, however, for nearby angles, the conditions c7 and c1 or c2 are also approximately satisfied, therefore, the coating also works for a range of angles. This is general applied to other embodiments as well. In this case, the angles calculated are from 60°–70° in glass (±7.60° in air). The minimum extinction ratios for both transmitted and reflected beams are better than 100:1. It is clear that this thin film polarizing device has a broad band, wide angle and reasonably high extinction ratios.

Figure 5A:
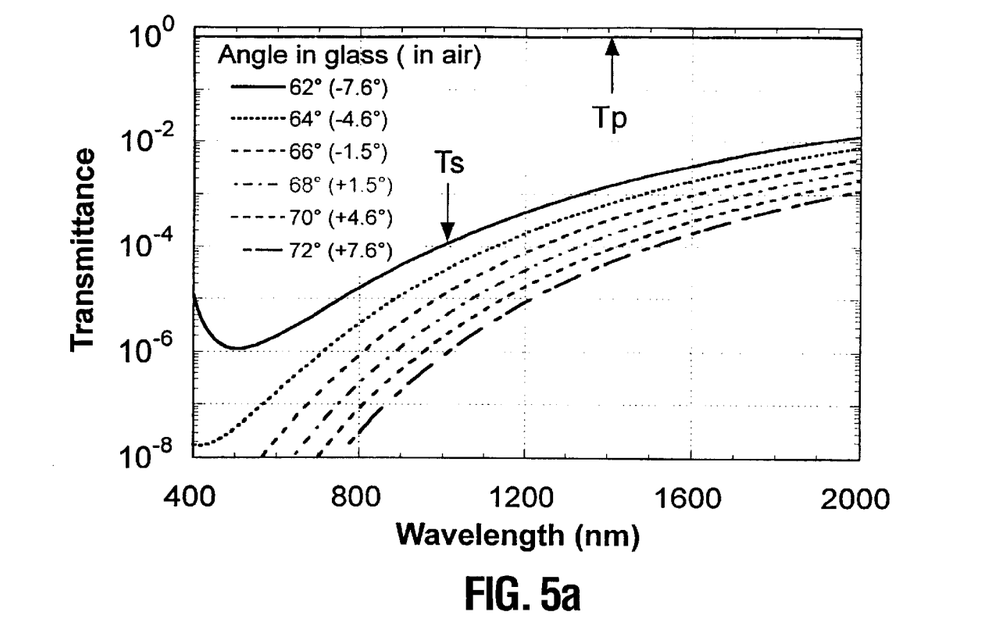
FIG. 5a shows the calculated transmittance of the second embodiment of the thin film polarizing device in accordance with the present invention at different angles of incidence.
Figure 5B:
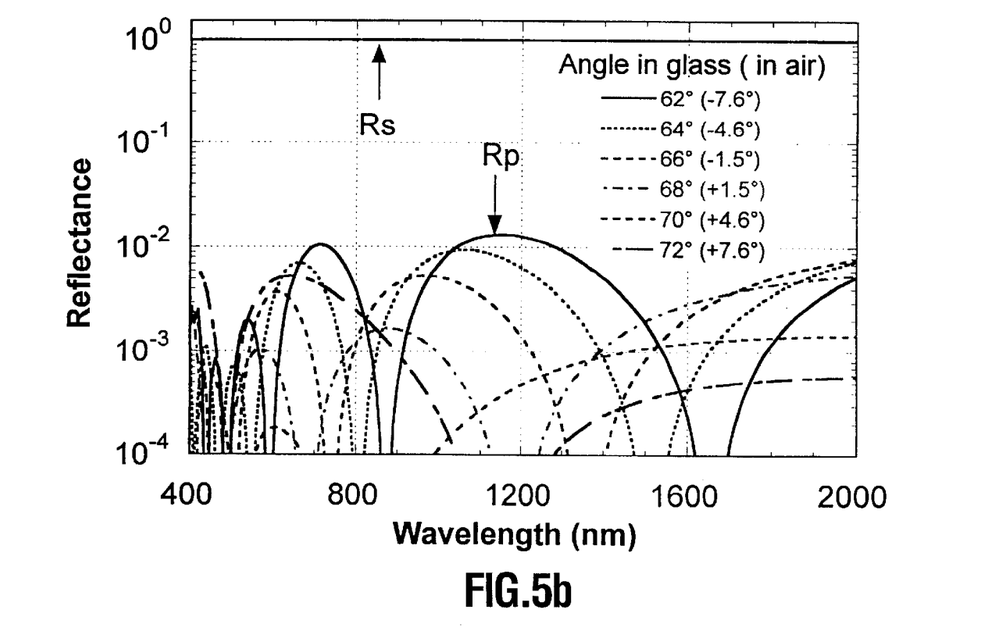
FIG. 5b shows the calculated reflectance of the second embodiment of the thin film polarizing device in accordance with the present invention at different angles of incidence.

The second embodiment is similar to the first embodiment with the same substrate and coating materials, however, the number of layers is 15, compared to 121 in the first embodiment. In practice, it is very difficult to make a thin metal-dielectric thin film coatings with more than 100 layers. To solve this problem, a starting design with a small N and thick layers was chosen. The starting design was then optimized. FIG. 5a and 5b show the calculated transmittance and reflectance at different angles of incidence. The angular field is between 62°–72° in glass (+7.6° in air). The wavelength range is also 400 to 2000 nm. It is clear that the second embodiment has a performance very similar to the first embodiment except that the extinction ratios are little worse.

Figure 6A:
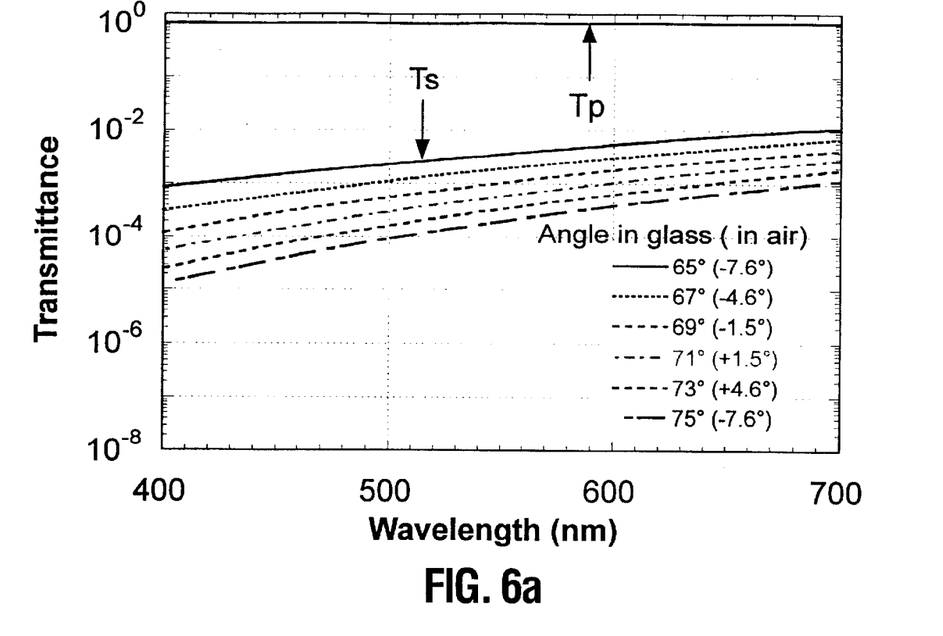
FIG. 6a shows the calculated transmittance of the third embodiment of the thin film polarizing device in accordance with the present invention at different angles of incidence.
Figure 6B:
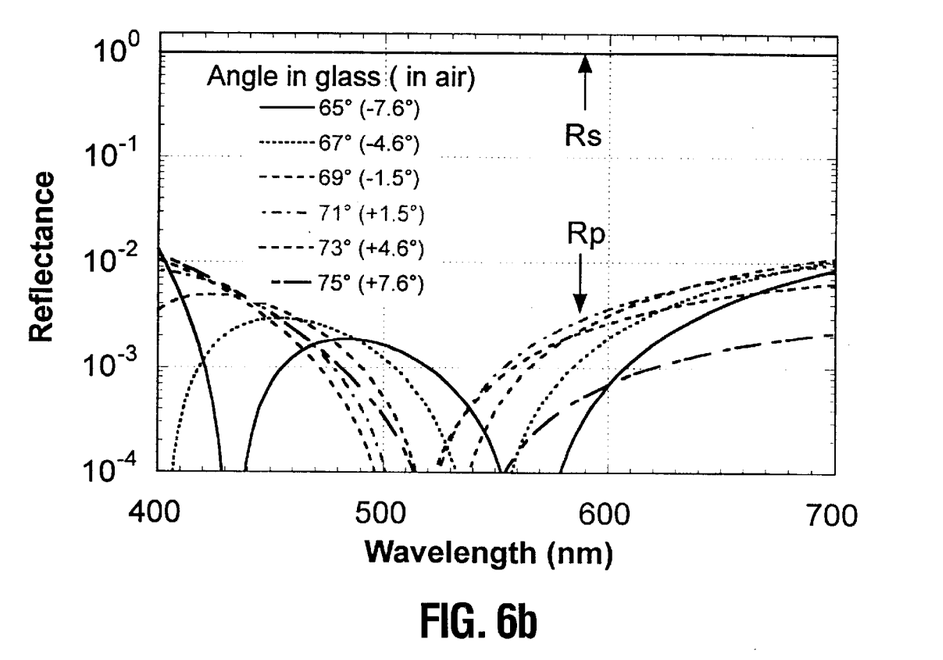
FIG. 6b shows the calculated reflectance of the third embodiment of the thin film polarizing device in accordance with the present invention at different angles of incidence.

The third embodiment consists of the same substrate and coating materials as the first and second embodiments. However, the bandwidth is smaller from 400–700 mn, compared to 400–2000 nm. As a result, the layer structure is significantly simple too. It consists of only 5 layers. FIGS. 6a and 6b show the calculated of transmittance and reflectance of the third embodiment for different angles of incidence. The angular field is between 65° and 75° in glass and ±7.6° in air. As the number of layers decreases, the layer thicknesses increase as well, the performance of the thin film polarizing device tends to have a better performance better at higher incident angles. The extinction ratios are better than 100:1 for most of angles and wavelengths.

Figure 7A:
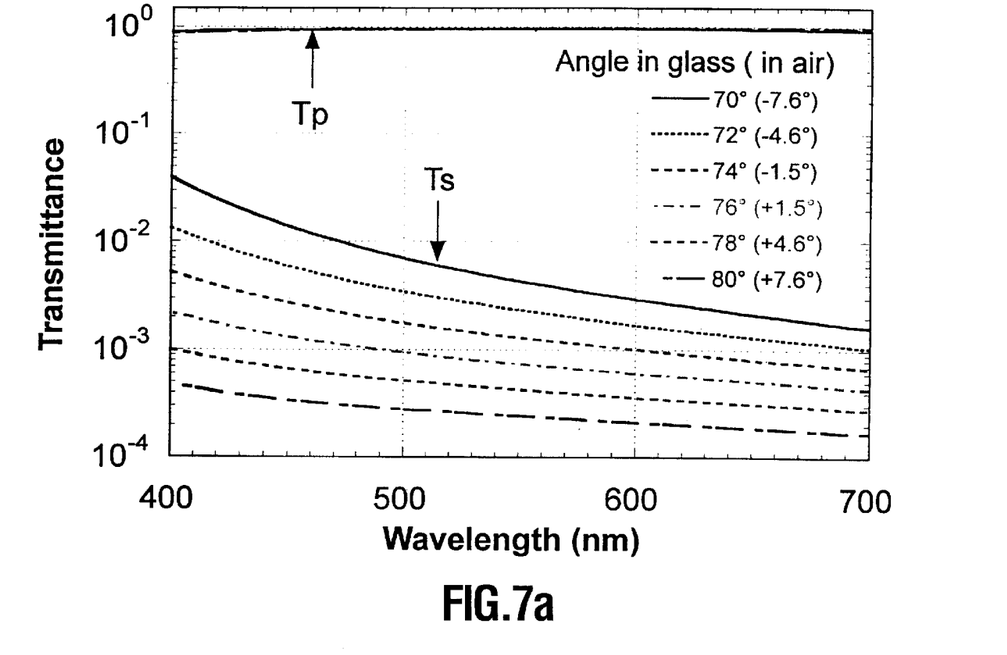
FIG. 7a shows the calculated transmittance of the fourth embodiment of the thin film polarizing device in accordance with the present invention at different angles of incidence.
Figure 7B:
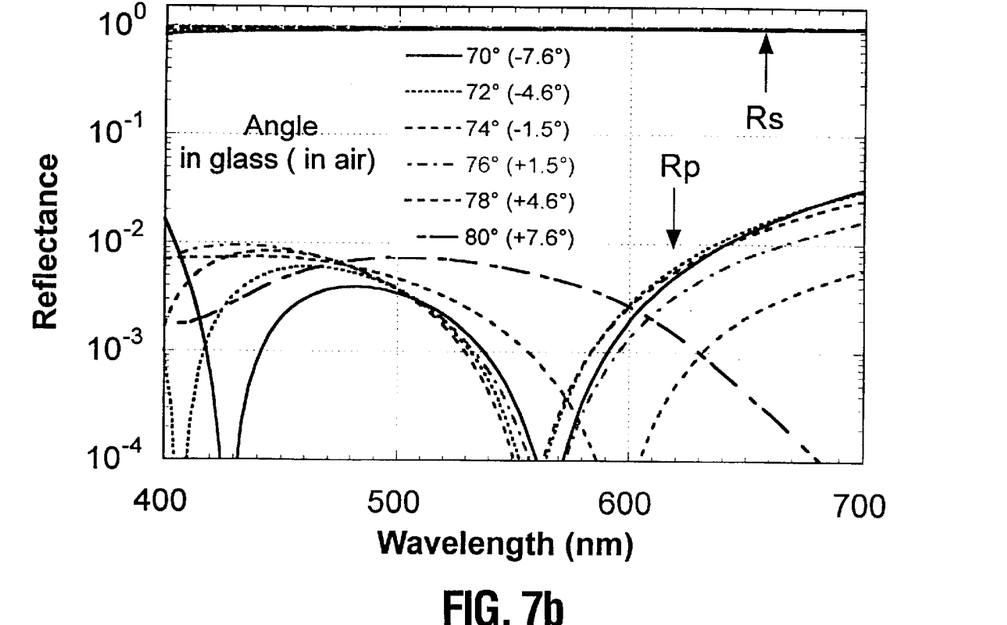
FIG. 7b shows the calculated reflectance of the fourth embodiment of the thin film polarizing device in accordance with the present invention at different angles of incidence.

The fourth embodiment consists of $SiO_2$ and Ag coating materials on BK7 glasses substrates. Unlike the above three embodiments which do not consider the dispersion of coating materials, the fourth embodiment uses the measured optical constants at different wavelengths, these measured optical constants are closed to the published data shown in the books of *"Handbook of Optical Constants of solids"* and *"Handbook of Optical Constants of solids II"*, both edited by E. D. Palik. In practice, the dispersion of some materials is large enough to be ignored. Therefore, it is necessary to replace the materials used in the above examples with the real optical constants of deposited films. The fourth embodiment is essentially the same as the third embodiment. The total number of layers is also 5. FIGS. 7a and 7b show the calculated transmittance and reflectance at different angles of incidence. Since the extinction coefficient of silver film change with wavelength from 2.0 at 400 nm to 4.7 at 700 nm, therefore, the lower-limited angle is different for different wavelengths. As a result, the working angles are higher than that of the third embodiment, between 70° and 80°. In addition, there is absorption in the coating as well because the small real refractive indices in the silver layers. The extinction ratio of the thin film polarizing coating gets better when the angle of incidence increases. In addition, the absorption becomes smaller as well because the metal layer thicknesses are thinner.

Figure 8A:
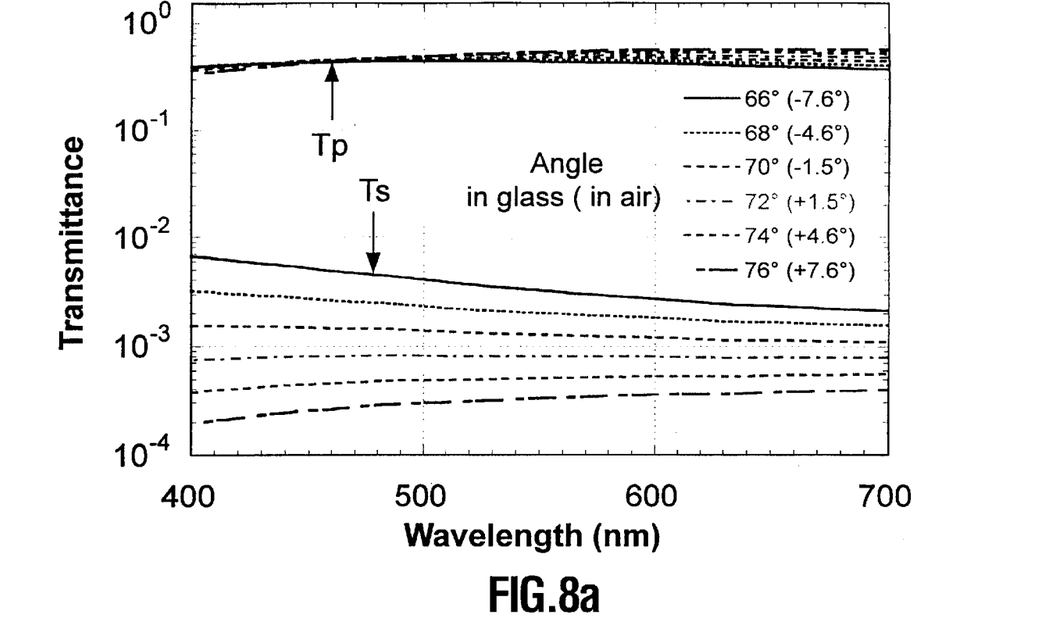
FIG. 8a shows the calculated transmittance of the fifth embodiment of the thin film polarizing device in accordance with the present invention at different angles of incidence.
Figure 8B:
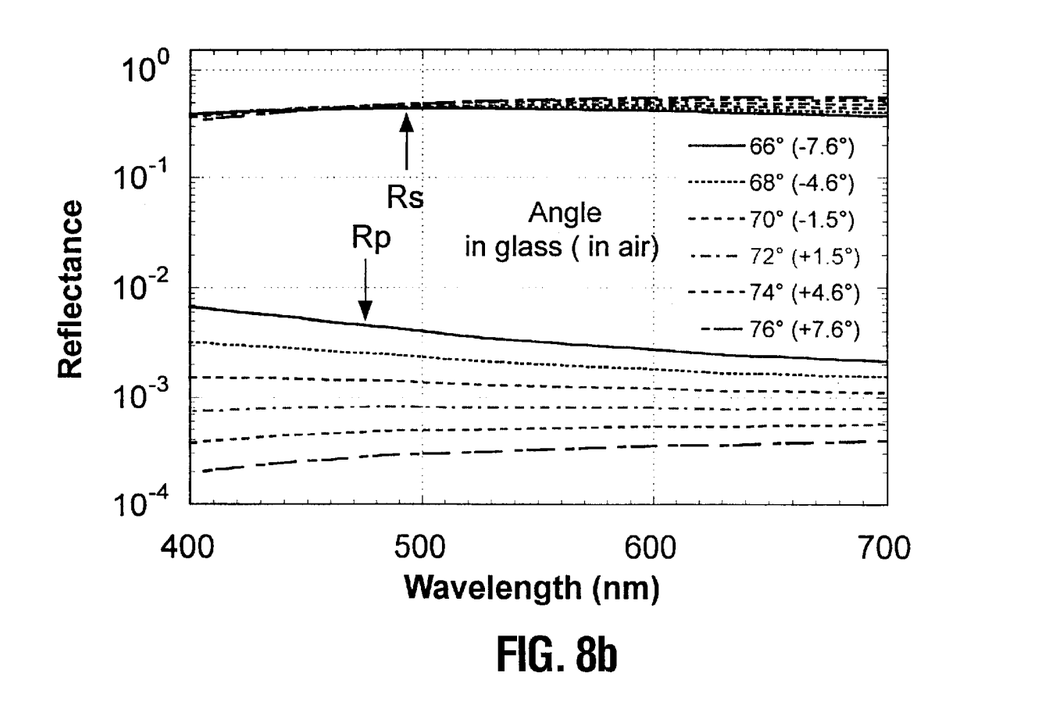
FIG. 8b shows the calculated reflectance of the fifth embodiment of the thin film polarizing device in accordance with the present invention at different angles of incidence.

The fifth embodiment consists of $SiO_2$ and Nickel coating materials on BK7 glasses substrates. As mentioned, the metal layers in the present invention are not necessary to have very small real refractive index n, metals with higher n can also be used such as Nickel. In this case, the absorption is large. So the transmittance and reflectance for the desired polarization are less than 100%. The optical constants of Nickel is taken from the books of *"Handbook of Optical Constants of solids"* and *"Handbook of Optical Constants of SolidsII"*, both edited by E. D. Palik. The total number of layers is 7. FIGS. 8a and 8b show the calculated transmittance and reflectance at different angles of incidence. The wavelength range is from 400–700 nm and the angular field is between 66°–76° in glass (±7.6° in air). As expected, the absorption in this embodiment is rather larger because the real refractive index n of the Nickel is about 1.6 to 2.0. The transmittance and reflectance for the desired polarization is only about 50%. The extinction ratios are about 100:1.

Without departing from the spirit of the present invention, other embodiments of the thin film polarizing device having different coating and substrate materials working at different wavelength regions and different angles of incidence can be designed.

The thin film polarizing device in accordance with the present invention is broad-band and wide angle. Although the extinction ratios are not as high as that of the thin film polarizing beam-splitter disclosed in the U.S. Pat. No. 5,912,762, it has a very simple structure, it can consist of only 3–7 layers and can be produced in large scale at low cost. As a result, they have a lot of potential applications. For example, it can be used in the proposed high-efficiency back-lighting systems for LCD displays. They can also be used as pre-polarizers in many applications.

The thin film polarizing device in accordance with the present invention can be manufactured with conventional physical vapor thin film deposition systems, such as resistance-heated evaporation, e-beam evaporation, ion-assisted evaporation, sputtering, ion-beam sputtering, etc., or chemical vapor deposition systems.

We claim:

1. A thin film polarizing device for operating at one or more predetermined wavelengths and angles of incidence, comprising a functional core consisting of at least two alternating thin film layers of a dielectric and a metal-like material that has a refractive index and extinction coefficient characteristic of a metal such that at said predetermined wavelengths said metal-like material behaves optically like a metal, said alternating thin film layers being sandwiched between a pair of transmissive optical media providing input and output ports, the thicknesses of said layers and the optical constants of said layers and said optical media being selected such at said predetermined wavelengths and angles of incidence the optical admittance of said functional core substantially matches the optical admittance of said optical media for one polarization and has substantially only an imaginary part for the other polarization, whereby light with said one polarization is transmitted, and light with the other polarization is reflected.

2. A thin film polarizing device as claimed in claim 1, wherein said functional core comprises at least one dielectric/metal-like material/dielectric thin film structure.

3. A thin film polarizing device as claimed in claim 2, wherein said functional core comprises a stack of adjacent repeating said dielectric/metal-like material/dielectric thin film structures.

4. A thin film polarizing device as claimed in claim 1, wherein said functional core comprises at least one metal-like material/dielectric/metal-like material thin film structure.

5. A thin film polarizing device as claimed in claim 4, wherein said functional core comprises a plurality of adjacent repeating said metal-like material/dielectric/metal-like material thin film structures.

6. A thin film polarizing device as claimed in claim 1, wherein said metal-like material is selected from the group consisting of: Si, Ge, or oxides thereof.

7. A thin film polarizing device as claimed in claim 1, wherein said dielectric material is transparent and is selected from the group consisting of $MgF_2$, $SiO_2$, $Al_2O_3$, $Nb_2O_5$, $TiO_2$, $ZrO_2$, $HfO_2$, Si, Ge, or mixtures of two or more transparent materials.

8. A thin film polarizing device as claimed in claim 1, wherein said transmissive optical media are selected from a group of optical glasses, semiconductors and optical plastics.

9. A thin film polarizing device as claimed in claim 1, wherein said optical media are prisms arranged to direct incoming light through said functional core at a predetermined angle of incidence $\theta_0$.

10. A thin film polarizing device comprising a functional core consisting of at least two alternating thin film layers of metal and dielectric sandwiched between a pair of transmissive optical media providing input and output ports, the thicknesses of said layers and the optical constants of said layers and said optical media being selected such at predetermined wavelengths and angles of incidence the optical admittance of said functional core substantially matches the optical admittance of said optical media for one polarization and has a substantial imaginary part for the other polarization, whereby light with said one polarization is transmitted, and light with the other polarization is reflected.

11. A thin film polarizing device as claimed in claim 10, wherein said metal is selected from the group consisting of Ag, Au, Al, nickel, Cu, and metal alloys.

12. A method of making a thin film polarizing device for operating at one or more predetermined wavelengths and angles of incidence comprising the steps of depositing at least two alternative win film layers of a dielectric and a metal-like material that has a refractive index and extinction coefficient characteristic of a metal such that at said predetermined wavelengths said metal-like material behaves optically like a metal on a first substrate; and providing a second substrate so that said two alternating thin film layers are sandwiched between said substrates providing input and output ports, and wherein the thicknesses of said layers and the optical constants of said layers and said optical media are selected such that at said predetermined wavelengths and angles of incidence the optical admittance of said functional core substantially matches the admittance of said optical media for one polarization and has substantially only an imaginary part for the other plane of polarization, whereby light with said one polarization is transmitted and light said other polarization is reflected.

13. A method as claimed in claim 12, wherein said functional core comprises a stack of adjacent repeating said dielectric/metal-like material/dielectric thin film structures.

14. A method as claimed in claim 12, wherein said metal-like material is a metal selected from the group consisting of: Ag, Au, Al, nickel, Cu, and metal alloys.

15. A method of separating a beam light into polarized light beams, comprising the steps providing a functional core consisting of at least two alternating thin film layers of a dielectric and a metal-like material that has a refractive index and extinction coefficient characteristic of a metal such that at said predetermined wavelengths said metal-like material behaves optically like a metal, said alternating thin film layers being sandwiched between a pair of transmissive optical media serving as input and output ports; and directing the beam of light at said functional core through the input port, the thicknesses of said layers and the optical constants of said layers and said optical media being selected such at the wavelength and angle of incidence of said light beam to said functional core, the optical admittance of said functional core substantially matches the optical admittance of said optical media for one polarization and has substantially only an imaginary part for the other polarization, whereby light with said one polarization is transmitted, and light with the other polarization is reflected.

* * * * *